US011097224B2

(12) United States Patent
Shimoda et al.

(10) Patent No.: US 11,097,224 B2
(45) Date of Patent: Aug. 24, 2021

(54) FLUID SEPARATING ELEMENT AND TELESCOPING PREVENTION PLATE

(71) Applicant: TORAY INDUSTRIES, INC., Tokyo (JP)

(72) Inventors: Shinya Shimoda, Ehime (JP); Masaaki Takenaka, Ehime (JP); Akira Katayama, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 82 days.

(21) Appl. No.: 16/498,820

(22) PCT Filed: Mar. 27, 2018

(86) PCT No.: PCT/JP2018/012614
§ 371 (c)(1),
(2) Date: Sep. 27, 2019

(87) PCT Pub. No.: WO2018/181411
PCT Pub. Date: Oct. 4, 2018

(65) Prior Publication Data
US 2021/0101118 A1 Apr. 8, 2021

(30) Foreign Application Priority Data
Mar. 31, 2017 (JP) .............................. JP2017-070202

(51) Int. Cl.
*B01D 63/10* (2006.01)
*C02F 1/44* (2006.01)
(52) U.S. Cl.
CPC .............. *B01D 63/106* (2013.01); *C02F 1/44* (2013.01); *B01D 2313/04* (2013.01)
(58) Field of Classification Search
CPC .............. B01D 63/106; B01D 2313/04; B01D 46/2414; B01D 2201/295; B01D 63/10;
(Continued)

(56) References Cited

U.S. PATENT DOCUMENTS

| 6,224,767 B1 * | 5/2001 | Fujiwara | ................ B01D 53/22 210/323.1 |
| 2004/0026310 A1 * | 2/2004 | Larsen | ................ B01D 63/12 210/323.1 |

(Continued)

FOREIGN PATENT DOCUMENTS

| CN | 101340970 A | 1/2009 |
| CN | 102307652 A1 | 1/2012 |

(Continued)

OTHER PUBLICATIONS

International Search Report, issued in PCT/JP2018/012614, PCT/ISA/210, dated May 15, 2018.

(Continued)

*Primary Examiner* — Pranav N Patel
(74) *Attorney, Agent, or Firm* — Birch, Stewart, Kolasch & Birch, LLP (57) ABSTRACT

This fluid separating element comprises: a spiral wound body formed by winding a separating membrane and a raw water flow passage material in a spiral shape; an outside shell provided on an outer periphery of the spiral wound body; and telescoping prevention plates provided at both ends of the spiral wound body and the outside shell, wherein the telescoping prevention plate comprises at least a second annular portion capable of holding the outside shell, and a third annular portion which is formed on an axially outer side of the second annular portion and comprises an annulus having a greater outer diameter than that of the second annular portion, and at least one depression is provided in a side surface on the spiral wound body side of the third annular portion.

6 Claims, 8 Drawing Sheets

(58) Field of Classification Search
CPC ........ B01D 2201/291; B01D 2201/293; B01D 2201/347; B01D 2313/21; C02F 1/44
See application file for complete search history.

(56) References Cited

U.S. PATENT DOCUMENTS

| | | | |
|---|---|---|---|
| 2006/0049093 A1* | 3/2006 | Chikura | B01D 63/10 210/321.83 |
| 2009/0277825 A1 | 11/2009 | Beppu et al. | |
| 2011/0290711 A1* | 12/2011 | Katayama | B01D 63/106 210/321.83 |
| 2012/0037562 A1 | 2/2012 | Beppu et al. | |
| 2012/0132579 A1 | 5/2012 | Cumin et al. | |
| 2014/0353239 A1 | 12/2014 | Lesan et al. | |
| 2016/0038881 A1 | 2/2016 | Yang et al. | |

FOREIGN PATENT DOCUMENTS

| | | |
|---|---|---|
| CN | 103228330 A | 7/2013 |
| JP | 59-24101 U | 2/1984 |
| JP | 2010-167420 A | 8/2010 |
| JP | 2010-194406 A | 9/2010 |
| JP | 2012-183464 A | 9/2012 |

OTHER PUBLICATIONS

Written Opinion of the International Searching Authority, issued in PCT/JP2018/012614, PCT/ISA/237, dated May 15, 2018.
Extended European Search Report dated Apr. 2, 2020, in European Patent Application No. 18778151.3
Office Action dated May 7, 2021, in Chinese Patent Application No. 201880021496.7.

* cited by examiner

FLUID SEPARATING ELEMENT AND TELESCOPING PREVENTION PLATE

TECHNICAL FIELD

The present invention relates to a fluid separation element used suitably for a reverse osmosis apparatus, a nanofiltration apparatus, an ultrafiltration apparatus, a microfiltration apparatus, etc.

BACKGROUND ART

In recent years, usage of fluid separation elements using separation membranes has been increased rapidly in various fluid separation fields using water permeated through the membranes or liquid concentrated by the membranes, such as seawater desalination applications, ultrapure water applications in a semiconductor field, general brackish water applications, organic substance separating applications, waste water reusing application, etc.

Examples of forms of fluid separation elements include a type using a hollow fiber membrane, a plate frame type of a flat membrane, and a spiral type. Among them, the spiral type fluid separation element has a structure in which a separation membrane is spirally wound around a water collection tube together with a permeate channel material and a raw water channel material. Raw water is supplied from one end surface of the fluid separation element, and treated by the separation membrane. The permeate which has been permeated through the separation membrane is taken out from the water collection tube, while the raw water which has not been permeated through the separation membrane is discharged as concentrated liquid from the other end surface of the fluid separation element.

In a typical form of the spiral type fluid separation element, an outer circumferential portion thereof is reinforced with an outer shell including fiber reinforced plastic (Fiber Reinforced Plastic (FRP)) of glass fiber and epoxy resin, and anti-telescoping plates are attached to the axially both ends of the fluid separation element.

A seal member called a brine seal is provided on the anti-telescoping plate on the upstream side of the fluid separation element so as to prevent raw water from passing through a short path into a gap between the outer shell of the fluid separation element and a pressure vessel. The brine seal may be an O-ring or the like, but a U-seal or the like is often used as the brine seal owing to its loadability to the pressure vessel.

When such fluid separation elements are used, about one to six fluid separation elements are loaded and used in series in a pressure vessel, and a number of such pressure vessels are placed on a rack to perform large-volume treatment.

In the background art, a fluid separation element has been known in which a groove is provided in each anti-telescoping plate so that an outer shell of the fluid separation element can be inserted externally in the groove in order to prevent the outer shell from moving in an axial direction of the fluid separation element (for example, see Patent Literature 1).

CITATION LIST

Patent Literature

Patent Literature 1: JP-A-2010-167420

SUMMARY OF INVENTION

Technical Problem

In this structure, it is indeed possible to suppress the outer shell from moving in the axial direction of the fluid separation element relatively to each anti-telescoping plate, but it is not possible to suppress the outer shell from moving in a rotation direction.

When the outer shell rotates relatively to the each anti-telescoping plate during operation, the spirally wound body may rotate together to cause collapse of the spirally wound body structure or damage on a surface of the separation membrane.

An object lying in the background of the present invention is to suppress the outer shell and each anti-telescoping plate from being displaced from each other in the rotation direction when raw water is supplied to the fluid separation element. Specifically, an object of the present invention is to suppress the outer shell from rotating even if force is applied in a direction to rotate the outer shell relatively to the each anti-telescoping plate when the fluid separation element loaded in a pressure vessel is operated.

Solution to Problem

In order to attain the foregoing object, a fluid separation element according to the present invention is configured as follows.

(1) A fluid separation element including: a spirally wound body including a separation membrane and a raw water channel material that are spirally wound; an outer shell provided on an outer circumference of the spirally wound body; and anti-telescoping plates provided to both end portions of the spirally wound body and the outer shell, in which each of the anti-telescoping plates includes at least a second annular portion capable of retaining the outer shell, and a third annular portion that is formed on an axially outer side of the second annular portion and has an annular shape with a larger outer diameter than an outer diameter of the second annular portion, and each of the anti-telescoping plates has at least one depression provided on a side surface of the third annular portion on a spirally wound body side.

(2) The fluid separation element according to the configuration (1), in which a sectional shape or position of the depression appearing when the third annular portion is sectionally cut by a plane including a central axis of a corresponding one of the anti-telescoping plates differs in a circumferential direction of the third annular portion.

(3) The fluid separation element according to the configuration (1) or (2), in which each of the anti-telescoping plates further includes a first annular portion that is formed on an axially inner side of the second annular portion and has an annular shape with a larger outer diameter than the outer diameter of the second annular portion.

(4) The fluid separation element according to any one of the configurations (1) to (3), in which each of the anti-telescoping plates further includes a fourth annular portion that is formed on an axially outer side of the third annular portion and in which a brine seal is capable of being externally inserted thereinto, and a fifth annular portion that is formed on an axially outer side of the fourth annular portion and has an annular shape with a larger outer diameter than an outer diameter of the fourth annular portion.

(5) An anti-telescoping plate, which is provided to one of both end portions of a spirally wound body and an outer shell of a fluid separation element, the fluid separation element including: the spirally wound body including a separation membrane and a raw water channel material that are spirally wound; the outer shell provided on an outer circumference of the spirally wound body; and the anti-telescoping plate, wherein the anti-telescoping plate includes at least a second annular portion capable of retaining the outer shell, and a third annular portion that is formed on an axially outer side of the second annular portion and has an annular shape with a larger outer diameter than an outer diameter of the second annular portion, and has at least one depression provided on a side surface of the third annular portion on a spirally wound body side.

(6) The anti-telescoping plate according to the configuration (5), in which a sectional shape or position of the depression appearing when the third annular portion is sectionally cut by a plane including a central axis of the anti-telescoping plate differs in a circumferential direction of the third annular portion.

(7) The anti-telescoping plate according to the configuration (5) or (6), further including a first annular portion that is formed on an axially inner side of the second annular portion, and has an annular shape with a larger outer diameter than the outer diameter of the second annular portion.

(8) The anti-telescoping plate according to any one of the configurations (5) to (7), further including a fourth annular portion that is formed on an axially outer side of the third annular portion and in which a brine seal is capable of being externally inserted thereinto, and a fifth annular portion that is formed on an axially outer side of the fourth annular portion and has an annular shape with a larger outer diameter than an outer diameter of the fourth annular portion.

Advantageous Effects of Invention

An advantageous effect obtained by the fluid separation element according to the present invention is that it is possible to suppress the outer shell from rotating relatively to each anti-telescoping plate even if force is generated in a direction to rotate the outer shell or the anti-telescoping plate when the fluid separation element is in use.

In addition, there is a method in which the spirally wound body and each anti-telescoping plate are fixed by a tape when the fluid separation element is manufactured, but the first annular portion and the second annular portion are covered with the tape on this occasion. Thus, even when depressions are provided in the first annular portion and the second annular portion, the depressions may exhibit no effect. When the positions of the depressions are limited to a side surface of the third annular portion on the spirally wound body side, the depressions can exhibit an effect even if the spirally wound body and the each anti-telescoping plate are fixed by a tape. Thus, the fluid separation element can be manufactured effectively.

DESCRIPTION OF EMBODIMENTS

Embodiments of the present invention will be described below with reference to the drawings.

Figure 1:
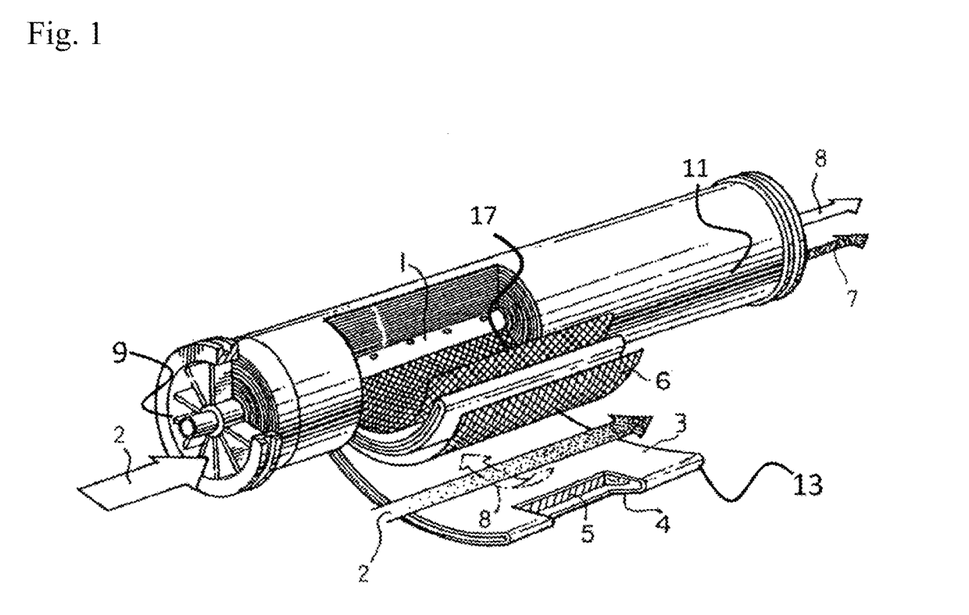
FIG. 1 is a schematic partial development showing an embodiment of a spiral type fluid separation element to which the present invention is applied.

FIG. 1 is a schematic partial development showing an embodiment of a fluid separation element to which the present invention is applied.

The fluid separation element is a spiral type fluid separation element, in which one unit or a plurality of units are prepared and spirally wound around a water collection tube 1. Each unit includes a first separation membrane 3, a second separation membrane 4, a permeate channel material 5 and a raw water channel material 6. In each unit, the first separation membrane 3 and the second separation membrane 4 are bonded to each other at their three sides to form an envelope-like membrane into which the permeate channel material 5 is inserted. The envelope-like membrane including the first separation membrane 3 and the second separation membrane 4 has a structure in which the first separation membrane 3 and the second separation membrane 4 are bonded at, of the four sides of the envelope-like membrane, all the sides except for the side on the water collection tube 1 side. The envelope-like membrane is open on the water collection tube 1 side. Raw water 2 is supplied from one end surface of the fluid separation element, and treated in an effective membrane portion 12 (see FIG. 4) which is a part where the first separation membrane 3 and the second separation membrane 4 are not bonded with each other. Permeate 8 which has been permeated through the separation membranes 3 and 4 is taken out from the water collection tube 1, and the raw water 2 which has not been permeated through the separation membranes 3 and 4 is discharged as concentrate 7 from the other end surface of the fluid separation element.

Typically the spiral type fluid separation element has a form in which an outer circumferential portion thereof is reinforced with an outer shell 11, and anti-telescoping plates 9 are attached to the longitudinally both ends. Examples of raw materials of the outer shell include fiber reinforced plastic (FRP) containing urethane resin, epoxy resin or the like, a plastic film containing polyethylene or polypropylene, etc. The outer shell is preferably an FRP shell including fiber reinforced plastic (FRP) from the viewpoint of pressure resistance, and more preferably an FPR shell including fiber reinforced plastic (FRP) containing glass fiber and epoxy resin from the viewpoint of heat resistance.

Figure 2:
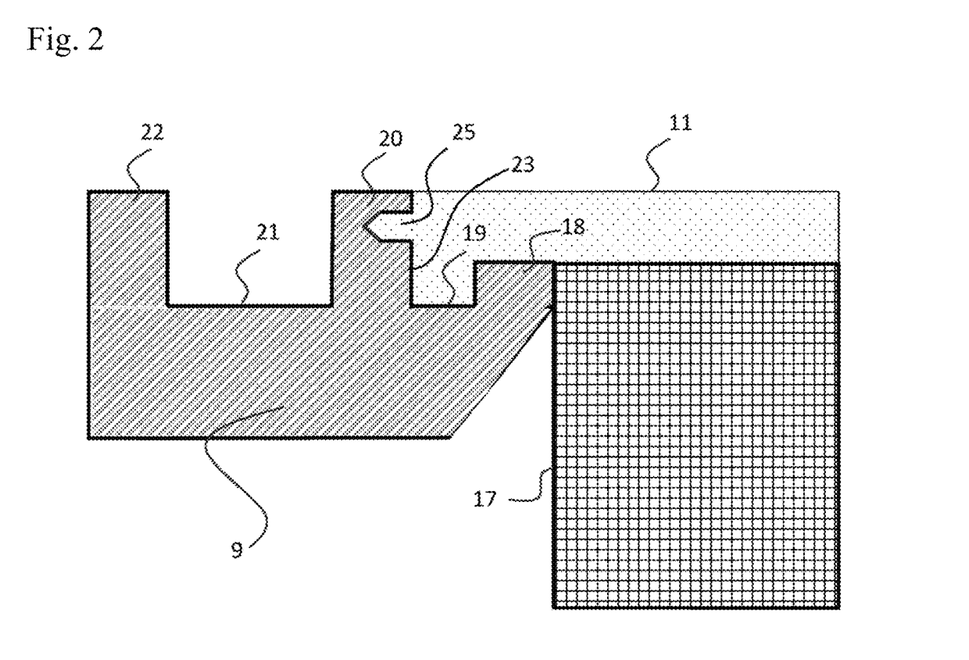
FIG. 2 is a sectional enlarged view showing, of the spiral type fluid separation element according to the present invention, vicinities of a contact portion between an outer circumferential annular portion of an anti-telescoping plate and an outer shell.

FIG. 2 is a sectional enlarged view showing, of the spiral type fluid separation element according to the present invention, vicinities of a contact portion between an outer circumferential annular portion of an anti-telescoping plate 9 and the outer shell 11.

Figure 3:
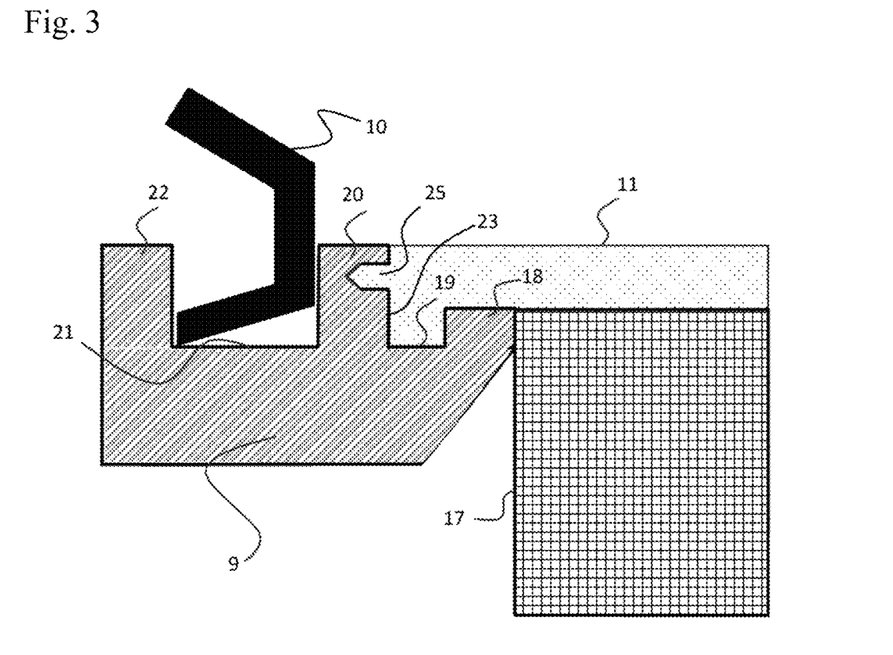
FIG. 3 is a sectional enlarged view showing, of the spiral type fluid separation element according to the present invention, the vicinities of the contact portion between the outer circumferential annular portion of the anti-telescoping plate and the outer shell when a brine seal is attached.

In addition, FIG. 3 is a sectional enlarged view showing, of the spiral type fluid separation element according to the present invention, the vicinities of the contact portion between the outer circumferential annular portion of the anti-telescoping plate 9 and the outer shell 11 when a brine seal 10 is attached.

Each anti-telescoping plate 9 according to the present invention includes a second annular portion 19 which can retain the outer shell 11, and a third annular portion 20 which is formed on the axially outer side of the second annular portion and in which an outer end portion of the outer shell 11 can be locked therein. Preferably the anti-telescoping plate 9 further includes a first annular portion 18 which is formed on the axially inner side of the second annular portion 19 and has an annular shape with a larger outer diameter than that of the second annular portion. Owing to the existence of the first annular portion 18, a step is made between the second annular portion 19 and the first annular portion 18 so that the outer shell 11 can be locked more easily, and axial displacement between the outer shell and the anti-telescoping plate can be more suppressed. In addition, a depression 25 is provided on a side surface of the third annular portion 20 on the axially inner side (specifically a side surface on the spirally wound body side when the anti-telescoping plate 9 is attached to the fluid separation element).

Preferably the anti-telescoping plate 9 further includes a fourth annular portion 21 which is formed on the axially outer side of the third annular portion 20 and in which the brine seal 10 can be externally inserted thereinto as shown in FIG. 3, and a fifth annular portion 22 which is formed on the axially outer side of the fourth annular portion 21 and in which the brine seal 10 can be locked therein. However, even when the fourth annular portion 21 and the fifth annular portion 22 are absent, the effects of the present invention can be exhibited.

Incidentally, in Japanese Patent No. 5742847, an anti-telescoping plate in which the fourth annular portion 21 and the fifth annular portion 22 are absent is exemplified.

In this example, a part of an outer side surface of a third annular portion of the anti-telescoping plate has a concavo-convex portion, and the concavo-convex portion has a complementary shape to a concavo-convex portion on an anti-telescoping plate opposed thereto. The concavo-convex portion bites the opposed concavo-convex portion complementarily so that the anti-telescoping plates opposed to each other can be sealed liquid-tightly, thereby playing a role as the brine seal 10.

The fluid separation element according to the present invention can be manufactured as follows. That is, the separation membranes 3 and 4 being formed into an envelope-like membrane and having the permeate channel material 5 inserted thereinto are wound around the water collection tube 1 together with the raw water channel material 6 so as to form a spirally wound body 17. The anti-telescoping plates 9 according to the present invention are fixed to the end surfaces of the spirally wound body 17 by taping or the like. Then, a resin composition for forming an outer shell is wound on the outer circumference of the spirally wound body 17 and the anti-telescoping plates 9. After that, the resin composition is hardened to produce the fluid separation element according to the present invention. Since the resin composition is hardened in a state that the resin composition has entered the second annular portion 19 and the depression 25 of each anti-telescoping plate 9, the outer shell 11 formed after the resin composition is hardened is firmly fixed to the anti-telescoping plates 9. Therefore, even if force is applied in a direction to rotate the outer shell relatively to each anti-telescoping plate, the outer shell can be suppressed from rotating.

Figure 5:
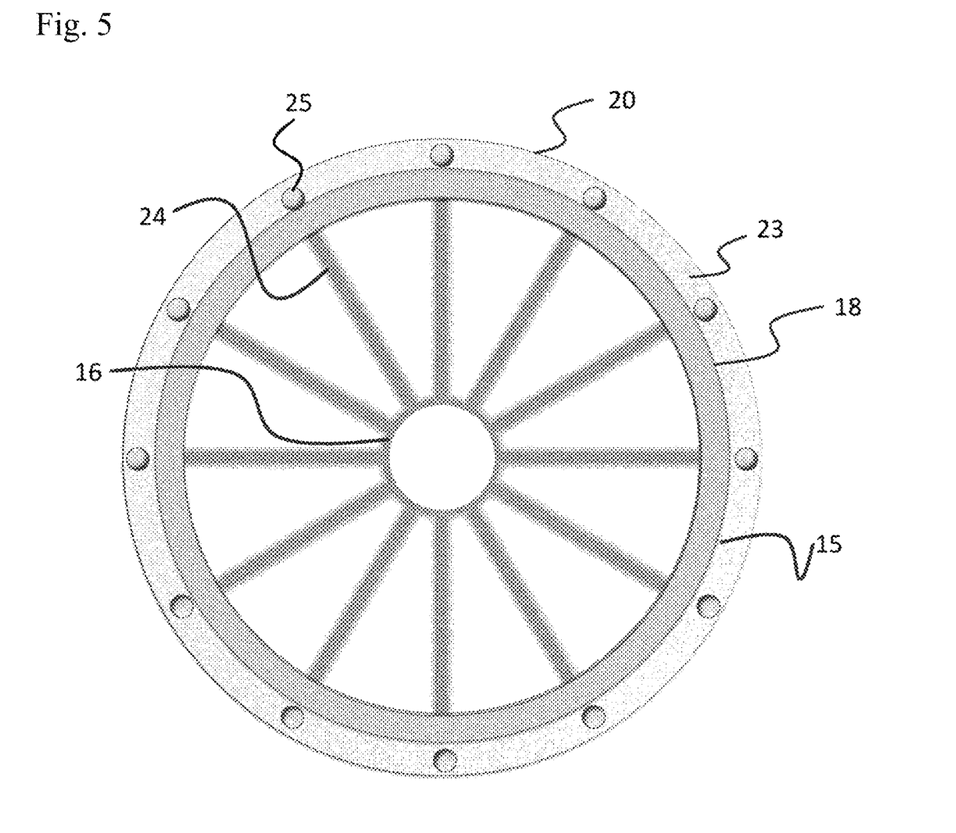
FIG. 5 is a view in which, among shapes which the anti-telescoping plate according to the present invention can be formed into, a preferred shape is observed from the spirally wound body side.

FIG. 5 is a view in which, among shapes which the anti-telescoping plate according to the present invention can be formed into, a preferred shape is observed from the spirally wound body side.

Each anti-telescoping plate 9 is constituted by an outer ring portion 15 constituted by the first annular portion 18, the second annular portion 19, the third annular portion 20, the fourth annular portion 21 and the fifth annular portion 22 as shown in FIG. 2; an inner ring portion 16 formed of a ring with a smaller outer diameter than that of the outer ring portion 15 as shown in FIG. 5; and spokes 24 connecting the outer ring portion 15 and the inner ring portion 16 with each other. Preferably the inner diameter of the inner ring portion 16 is larger than the outer diameter of the water collection tube 1.

In the fluid separation element according to the present invention, the depression 25 is provided on a side surface 23 (side surface of a third annular portion on a spirally wound body side) of the third annular portion 20 on the spirally wound body side of each anti-telescoping plate 9 in order to prevent the outer shell 11 from rotating relatively to the each anti-telescoping plate 9. The outer shell 11 and the anti-telescoping plate 9 are externally inserted into the second annular portion 19, and brought into contact with the third annular portion 20. On this occasion, a part of the outer shell 11 enters the depression 25 on the third annular portion 20 so as to have a shape in which an anchor is driven from the outer shell 11 to the anti-telescoping plate 9. Thus, the outer shell 11 is suppressed from rotating relatively to the each anti-telescoping plate 9.

A sectional shape or position of the depression 25 appearing when the third annular portion 20 is sectionally cut by a plane passing the central axis of a corresponding one of the anti-telescoping plates 9 preferably differs in the circumferential direction of the third annular portion 20. Here, the phrase "a sectional shape or position of the depression 25 appearing when the third annular portion 20 is sectionally cut differs in the circumferential direction of the third annular portion 20" means that the shape or position appearing when the third annular portion 20 is sectionally cut by an arbitrary plane passing the central axis of a corresponding one of the anti-telescoping plates 9 may differ depending on the planes. In a case where the sectional shape or position of the depression 25 is uniform in the circumferential direction of the third annular portion 20, there is no anchor for preventing the outer shell 11 and the anti-telescoping plate 9 from rotating relatively to each other even if a part of the outer shell 11 enters into the depression 25. Therefore, the effects of the present invention may not be sufficiently exhibited.

The brine seal 10 is externally inserted to the anti-telescoping plate 9 on the upstream side of the fluid separation element so as to prevent raw water from passing through a short path into a gap between the outer shell of the fluid separation element and a pressure vessel. The brine seal may be an O-ring or the like, but a U-seal, a split ring seal or the like is often used as the brine seal owing to its loadability to the pressure vessel. Particularly for the U-seal, a U-part thereof is opened when fluid flows therein from the upstream side, so that the anti-telescoping plate and the pressure vessel can be sealed liquid-tightly.

Each of FIG. 5, FIG. 6, FIG. 7, FIG. 8 and FIG. 9 is a view in which, among the shapes which the anti-telescoping plate according to the present invention can be formed into, a preferred shape is observed from the spirally wound body side.

As a preferred shape, for example, a method in which a total of 12 depressions 25 are provided, with intervals of 30 degrees, on the side surface 23 of the third annular portion on the spirally wound body side as shown in FIG. 5, may be used.

Figure 6:
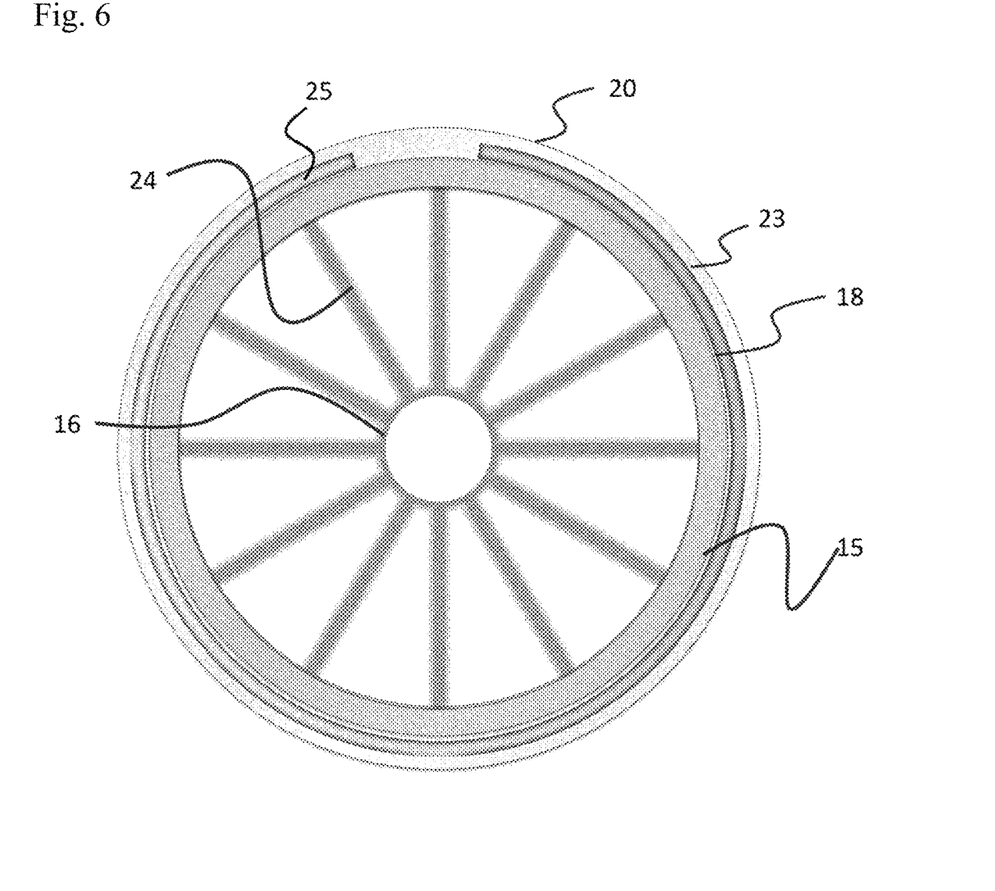
FIG. 6 is a view in which, among the shapes which the anti-telescoping plate according to the present invention can be formed into, a preferred shape is observed from the spirally wound body side.

According to an alternative shape, there may be one arc-like depression 25 on the side surface 23 of the third annular portion on the spirally wound body side as shown in FIG. 6.

Figure 7:
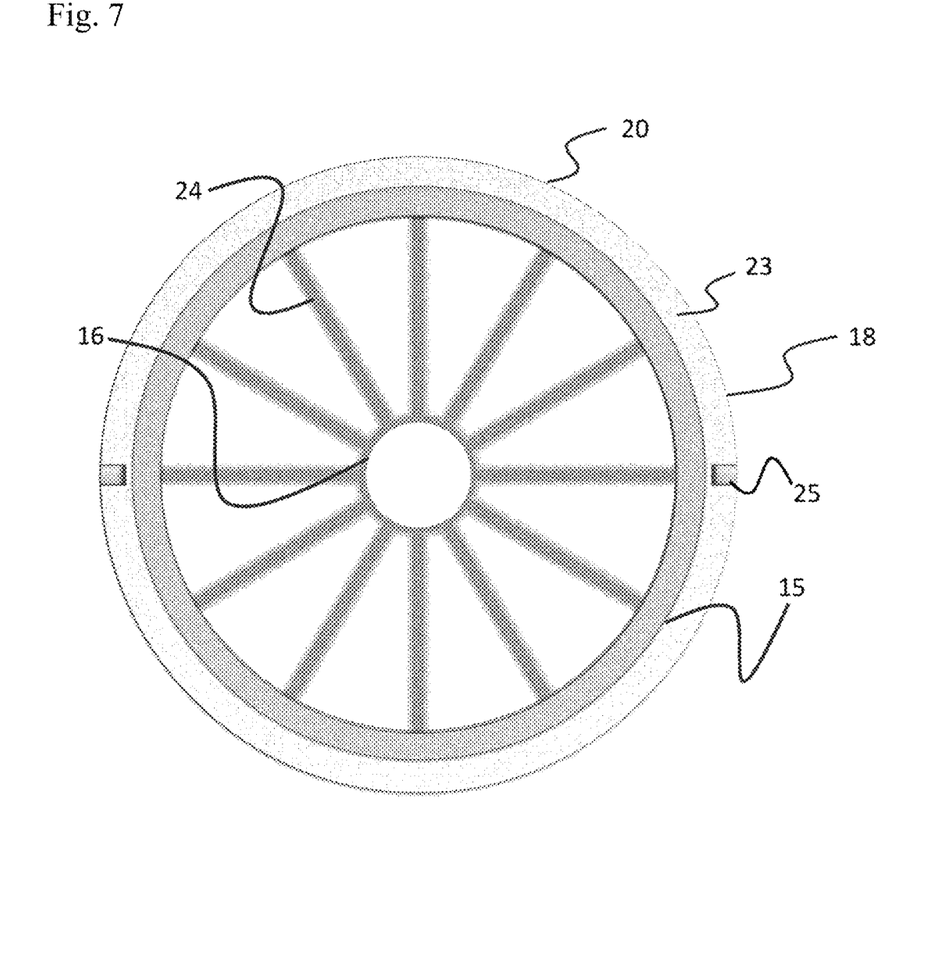
FIG. 7 is a view in which, among the shapes which the anti-telescoping plate according to the present invention can be formed into, a preferred shape is observed from the spirally wound body side.

According to an alternative shape, there may be depressions 25 on an outer circumferential part of the side surface 23 of the third annular portion on the spirally wound body side as shown in FIG. 7.

Figure 8:
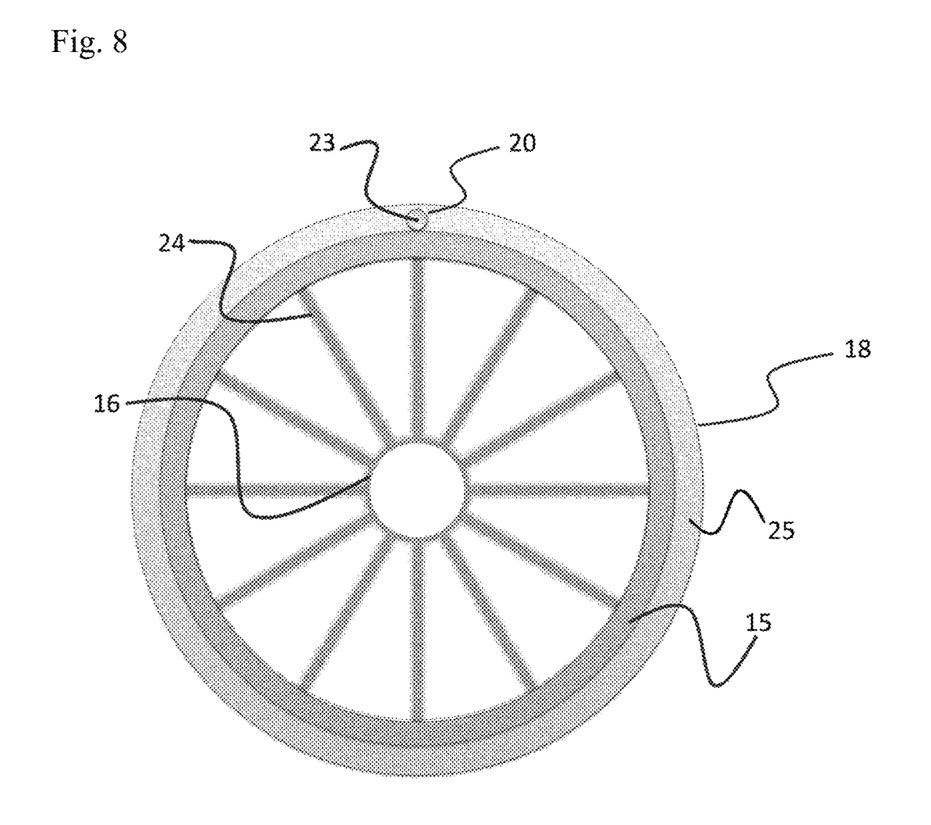
FIG. 8 is a view in which, among the shapes which the anti-telescoping plate according to the present invention can be formed into, a preferred shape is observed from the spirally wound body side.

According to an alternative shape, whole part of the side surface 23 of the third annular portion on the spirally wound body side, excluding a part thereof, may form a depression 25 as shown in FIG. 8.

Figure 9:
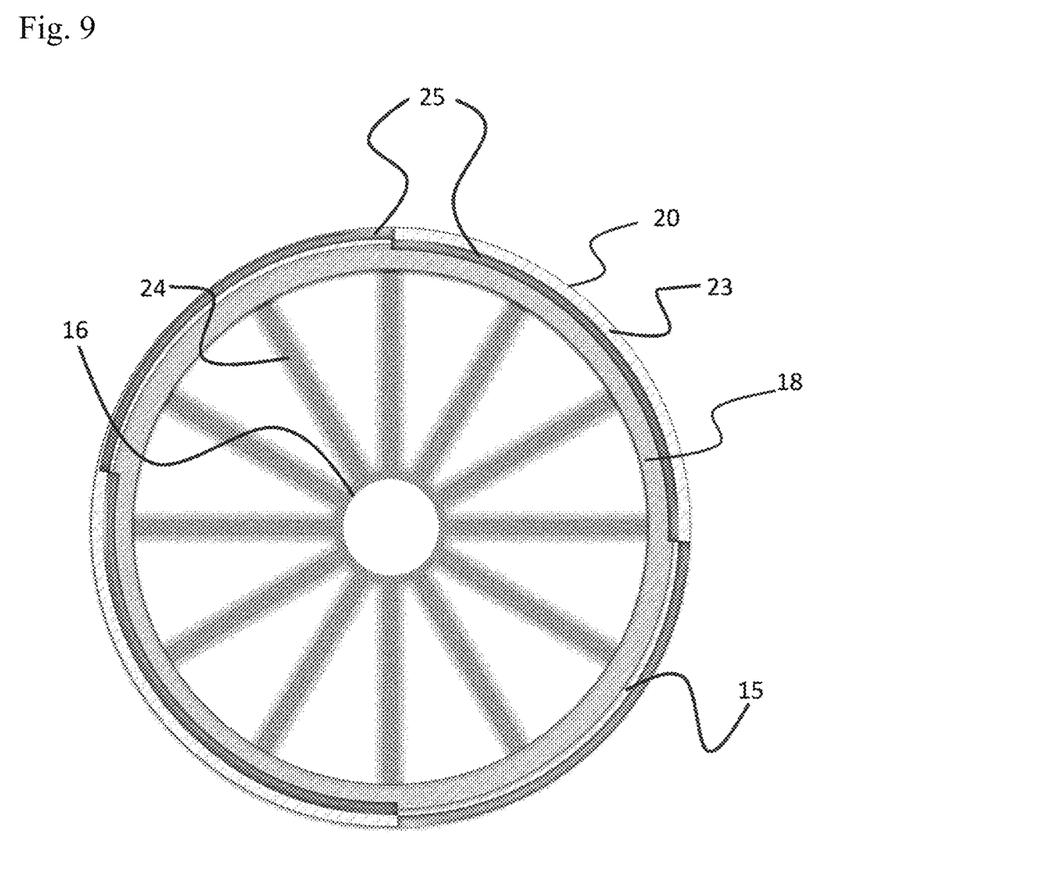
FIG. 9 is a view in which, among the shapes which the anti-telescoping plate according to the present invention can be formed into, a preferred shape is observed from the spirally wound body side.

According to an alternative shape, depressions 25 may be formed of parts of arcs of two or more concentric circles having the same sectional shape. In this case, the sectional shape of each depression 25 appearing when the third annular portion 20 is sectionally cut by a plane including the central axis of the anti-telescoping plate 9 is uniform independently of the plane. However, since the sectional positions of the depression 25 differs, this is a preferable shape for exhibiting the effects of the present invention.

Only in order to prevent the outer shell 11 from rotating, each depression 25 made on the side surface 23 of the third annular portion on the spirally wound body side may be a through hole penetrating the third annular portion 20. However, when epoxy resin enters onto the fourth annular portion 21 through the through hole, there is a concern that the brine seal 10 cannot be attached. Therefore, it is preferable that the depression 25 is a depression.

The upper limit of the depth of the depression 25 is preferably a depth within a range of not being a through hole, and preferably smaller than the thickness of the third annular portion 20 of the anti-telescoping plate 9.

Incidentally, the number of depressions for preventing the rotation is preferably one or more.

The total volume of the depressions 25 is preferably 0.05% or more and more preferably 0.5% or more of the total volume of the third annular portion 20 in order to exhibit the effect of suppressing the rotation.

When the total volume of the depressions 25 increases, the amount of epoxy resin required for forming the outer shell increases. It is therefore preferable that the total volume of the depressions 25 is about less than 5% of the total volume of the third annular portion 20.

Figure 10:
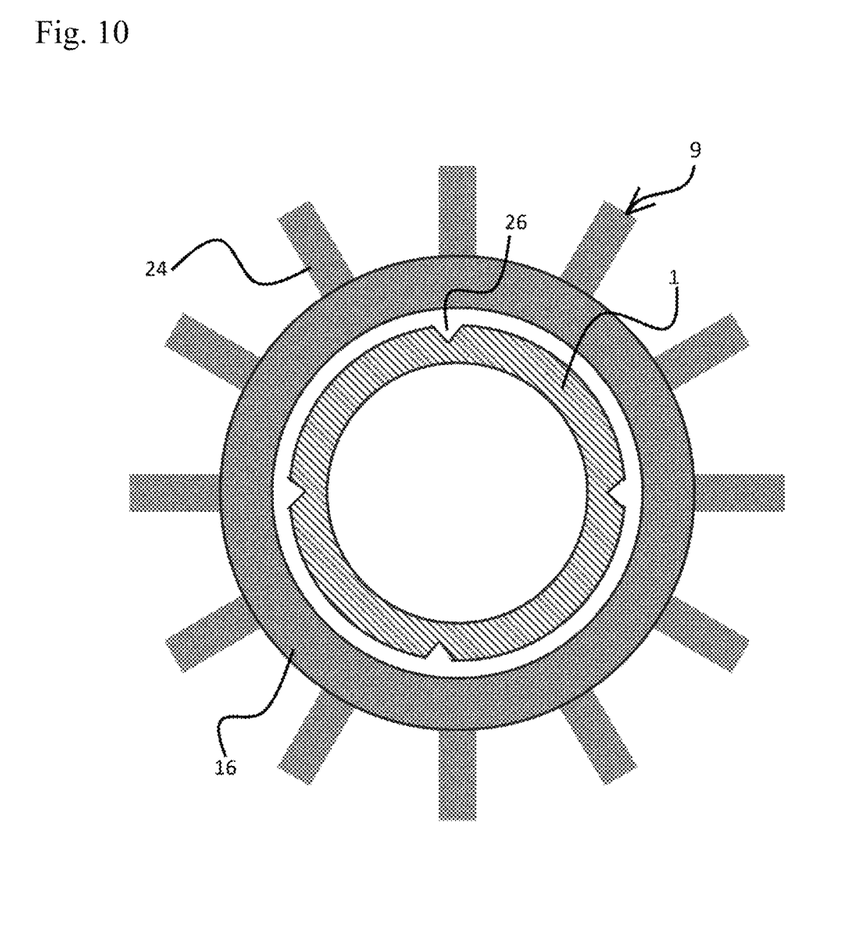
FIG. 10 is a more preferable sectional shape in vicinities of a part where a water collection tube and the anti-telescoping plate are in contact with each other.

FIG. 10 is a more preferable sectional shape in vicinities of a part where the water collection tube 1 and the anti-telescoping plate 9 are in contact with each other. As shown in FIG. 10, a structure that depressions 26 are provided in a part on the water collection tube 1 where the anti-telescoping plate 9 and the water collection tube 1 are in contact with each other is more preferable. Alternatively, the depressions 26 may be provided in a part on the anti-telescoping plate 9 where the anti-telescoping plate 9 and the water collection tube 1 are in contact with each other. On this occasion, the water collection tube 1 and the anti-telescoping plate 9 are bonded to each other through a bonding agent, and the bonding agent entering into the depressions of the water collection tube is hardened so that the anti-telescoping plate 9 can be suppressed from rotating relatively to the water collection tube 1.

EXAMPLES

Next, the fluid separation element using the anti-telescoping plates according to the present invention will be described along its specific examples. However, the present invention is not limited by these examples.

Example 1

As shown in FIG. 5, a total of 12 depressions 25 were provided, with intervals of 30 degrees, on a side surface 23 of a third annular portion on a spirally wound body side in each anti-telescoping plate 9. Each depression 25 had a diameter of 4 mm and a depth of 2 mm, and the total volume of the depressions 25 was 339 mm$^3$, which occupied 0.5% of the total volume of the third annular portion 20.

A fluid separation element was manufactured using the aforementioned anti-telescoping plates. As shown in FIG. 1, the fluid separation element had a structure in which an outer shell 11 including FRP was provided on the outer circumference of a spirally wound body 17 in which a first separation membrane 3, a second separation membrane 4, a permeate channel material 5 and a raw water channel material 6 were spirally wound, while the anti-telescoping plates 9 were disposed in the both end portions of the spirally wound body 17 and the outer shell 11.

Figure 4:
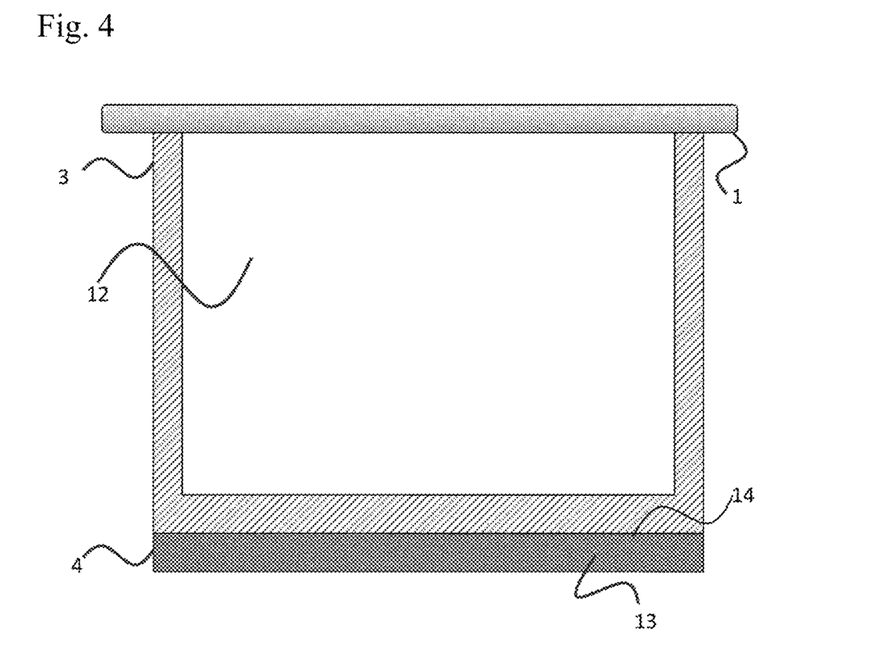
FIG. 4 is a schematic view showing a form of an envelope-like membrane for use in the spiral type fluid separation element according to the present invention.

In addition, FIG. 4 is a schematic view showing a form of an envelope-like membrane for use in the spiral type fluid separation element according to the present invention. The envelope-like membrane used in the spirally wound body 17 has a combination of the first separation membrane 3 and the second separation membrane 4 so that the first separation membrane 3 is 40 mm shorter than the second separation membrane 4, as shown in FIG. 4.

On this occasion, a bonding agent used for bonding the first separation membrane 3 and the second separation membrane 4 leaks wholly or partially from an outer circumferential bonding portion 14 of the envelope-like membrane. Thus, outer circumferential end portions 13 in the envelope-like membranes adjacent to each other are wholly or partially fixed to each other through the bonding agent. In addition, the bonding agent is in contact with only the other part than the effective membrane portion 12 of the first separation membrane 3 and the second separation membrane 4. The area of the effective membrane portion 12 is 0.7 m$^2$ or more.

A test water flow test was performed using the aforementioned fluid separation element. One fluid separation element was loaded in a pressure vessel, and operated for five days at five hours per day.

As test water, iron (III) chloride and polyacrylamide were added as flocculant into a 2,000 ppm wheat-flour suspension. Operation pressure was 0.5 MPa.

A rotation angle of the outer shell relative to the anti-telescoping plates was measured after the 5-days operation. The rotation angle was 0 degree.

Comparative Example 1

A fluid separation element was manufactured using anti-telescoping plates each having no depression on a surface (a side surface of a third annular portion on the spirally wound body side) in contact with an end surface of an outer shell.

As shown in FIG. 1, the fluid separation element had a structure in which an outer shell 11 including FRP was provided on the outer circumference of a spirally wound body 17 in which a first separation membrane 3, a second separation membrane 4, a permeate channel material 5 and a raw water channel material 6 were spirally wound, while the anti-telescoping plates 9 were disposed in the both end portions of the spirally wound body 17 and the outer shell 11.

A test water flow test was performed using the aforementioned fluid separation element. One fluid separation element was loaded in a pressure vessel, and operated for five days at five hours per day.

As test water, iron (III) chloride and polyacrylamide were added as flocculant into a 2,000 ppm wheat-flour suspension. Operation pressure was 0.5 MPa.

A rotation angle of the outer shell relative to the anti-telescoping plates was measured after the 5-days operation. The rotation angle was 1.2 degrees.

Although the present invention has been described in detail and with reference to its specific embodiment, it is obvious for those in the art that various changes or modifications can be made thereon without departing from the spirit and scope of the present invention. The present application is based on a Japanese patent application (Japanese Patent Application No. 2017-070202) filed on Mar. 31, 2017, the contents of which are incorporated herein by reference.

REFERENCE SIGNS LIST

1: water collection tube
2: raw water
3: first separation membrane
4: second separation membrane
5: permeate channel material
6: raw water channel material
7: concentrate
8: permeate
9: anti-telescoping plate
10: brine seal
11: outer shell
12: effective membrane portion
13: outer circumferential end portion of envelope-like membrane
14: outer circumferential bonding portion of envelope-like membrane
15: outer ring portion
16: inner ring portion
17: spirally wound body
18: first annular portion
19: second annular portion
20: third annular portion
21: fourth annular portion
22: fifth annular portion
23: side surface of third annular portion on spirally wound body side
24: spoke
25: depression
26: depression

The invention claimed is:

1. A fluid separation element comprising:
a spirally wound body comprising a separation membrane and a raw water channel material that are spirally wound;
an outer shell provided on an outer circumference of the spirally wound body; and
anti-telescoping plates provided to both end portions of the spirally wound body and the outer shell,
wherein each of the anti-telescoping plates includes at least a second annular portion capable of retaining the outer shell, and a third annular portion that is formed on an axially outer side of the second annular portion and has an annular shape with a larger outer diameter than an outer diameter of the second annular portion,
wherein each of the anti-telescoping plates has at least one depression provided on a side surface of the third annular portion on a spirally wound body side,
wherein a sectional shape or position of the depression appearing when the third annular portion is sectionally cut by a plane including a central axis of a corresponding one of the anti-telescoping plates differs in a circumferential direction of the third annular portion, and
wherein at least a part of the outer shell enters into the depression.

2. The fluid separation element according to claim 1, wherein each of the anti-telescoping plates further includes a first annular portion that is formed on an axially inner side of the second annular portion and has an annular shape with a larger outer diameter than the outer diameter of the second annular portion.

3. The fluid separation element according to claim 1, wherein each of the anti-telescoping plates further includes a fourth annular portion that is formed on an axially outer side of the third annular portion and in which a brine seal is capable of being externally inserted thereinto, and a fifth annular portion that is formed on an axially outer side of the fourth annular portion and has an annular shape with a larger outer diameter than an outer diameter of the fourth annular portion.

4. An anti-telescoping plate, which is provided to one of both end portions of a spirally wound body and an outer shell of a fluid separation element, the fluid separation element comprising:
the spirally wound body comprising a separation membrane and a raw water channel material that are spirally wound;
the outer shell provided on an outer circumference of the spirally wound body; and
the anti-telescoping plate,
wherein the anti-telescoping plate includes at least a second annular portion capable of retaining the outer shell, and a third annular portion that is formed on an axially outer side of the second annular portion and has an annular shape with a larger outer diameter than an outer diameter of the second annular portion,
wherein the anti-telescoping plate has at least one depression provided on a side surface of the third annular portion on a spirally wound body side, and wherein a sectional shape or position of the depression appearing when the third annular portion is sectionally cut by a plane including a central axis of the anti-telescoping plate differs in a circumferential direction of the third annular portion.

5. The anti-telescoping plate according to claim 4, further including a first annular portion that is formed on an axially inner side of the second annular portion, and has an annular shape with a larger outer diameter than the outer diameter of the second annular portion.

6. The anti-telescoping plate according to claim 4, further including a fourth annular portion that is formed on an axially outer side of the third annular portion and in which a brine seal is capable of being externally inserted thereinto, and a fifth annular portion that is formed on an axially outer side of the fourth annular portion and has an annular shape with a larger outer diameter than an outer diameter of the fourth annular portion.

\* \* \* \* \*